United States Patent
Voelkl

(10) Patent No.: US 7,068,375 B2
(45) Date of Patent: Jun. 27, 2006

(54) DIRECT-TO-DIGITAL HOLOGRAPHY REDUCTION OF REFERENCE HOLOGRAM NOISE AND FOURIER SPACE SMEARING

(75) Inventor: Edgar Voelkl, Austin, TX (US)

(73) Assignee: UT-Battelle LLC, Oak Ridge, TN (US)

(*) Notice: Subject to any disclaimer, the term of this patent is extended or adjusted under 35 U.S.C. 154(b) by 339 days.

(21) Appl. No.: 10/349,579

(22) Filed: Jan. 23, 2003

(65) Prior Publication Data

US 2004/0145745 A1 Jul. 29, 2004

(51) Int. Cl.
*G01B 9/02* (2006.01)

(52) U.S. Cl. .................................. 356/489; 356/457

(58) Field of Classification Search ............... 356/457, 356/458, 463, 464, 511, 512, 489, 495
See application file for complete search history.

(56) References Cited

U.S. PATENT DOCUMENTS

| | | | | |
|---|---|---|---|---|
| 5,299,035 A | * | 3/1994 | Leith et al. ............... | 359/9 |
| 5,386,119 A | * | 1/1995 | Ledger ................. | 250/341.8 |
| 6,078,392 A | * | 6/2000 | Thomas et al. ............ | 356/457 |
| 6,137,573 A | * | 10/2000 | Luke et al. ............... | 356/453 |
| 6,330,086 B1 | * | 12/2001 | Collot et al. .............. | 359/9 |
| 6,747,771 B1 | * | 6/2004 | Thomas et al. ............ | 356/457 |

FOREIGN PATENT DOCUMENTS

WO    WO 00/20929    4/2000

OTHER PUBLICATIONS

Reynolds, Develis, Parrent, Thompson: "The New Physical Optics Notebook: Tutorial In Fourier Optics" 1989, American Institute of Physics and SPIE The International Society for Optical Engineering, New York, Washington, XP002288228, pp. 208-209, figure 21.14.

* cited by examiner

*Primary Examiner*—Gregory J. Toatley, Jr.
*Assistant Examiner*—Patrick J. Connolly
(74) *Attorney, Agent, or Firm*—John Bruckner PC

(57) ABSTRACT

Systems and methods are described for reduction of reference hologram noise and reduction of Fourier space smearing, especially in the context of direct-to-digital holography (off-axis interferometry). A method of reducing reference hologram noise includes: recording a plurality of reference holograms; processing the plurality of reference holograms into a corresponding plurality of reference image waves; and transforming the corresponding plurality of reference image waves into a reduced noise reference image wave. A method of reducing smearing in Fourier space includes: recording a plurality of reference holograms; processing the plurality of reference holograms into a corresponding plurality of reference complex image waves; transforming the corresponding plurality of reference image waves into a reduced noise reference complex image wave; recording a hologram of an object; processing the hologram of the object into an object complex image wave; and dividing the complex image wave of the object by the reduced noise reference complex image wave to obtain a reduced smearing object complex image wave.

27 Claims, 2 Drawing Sheets

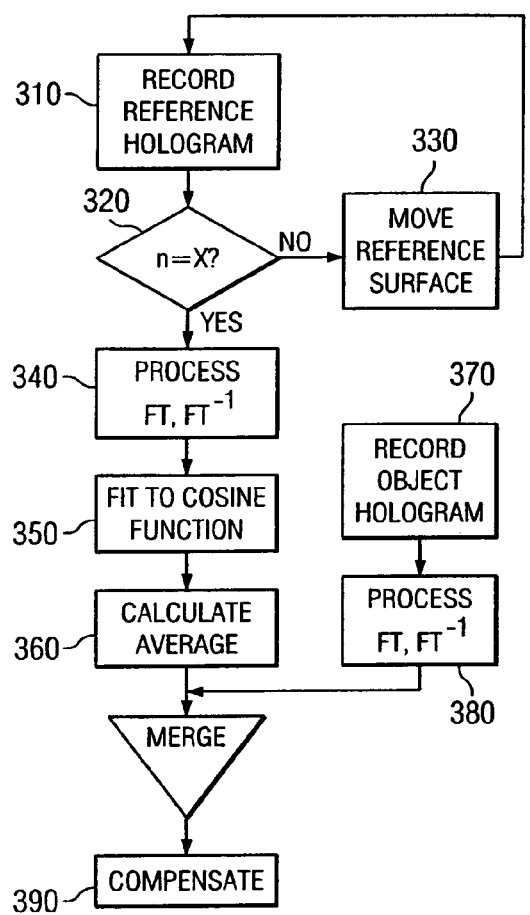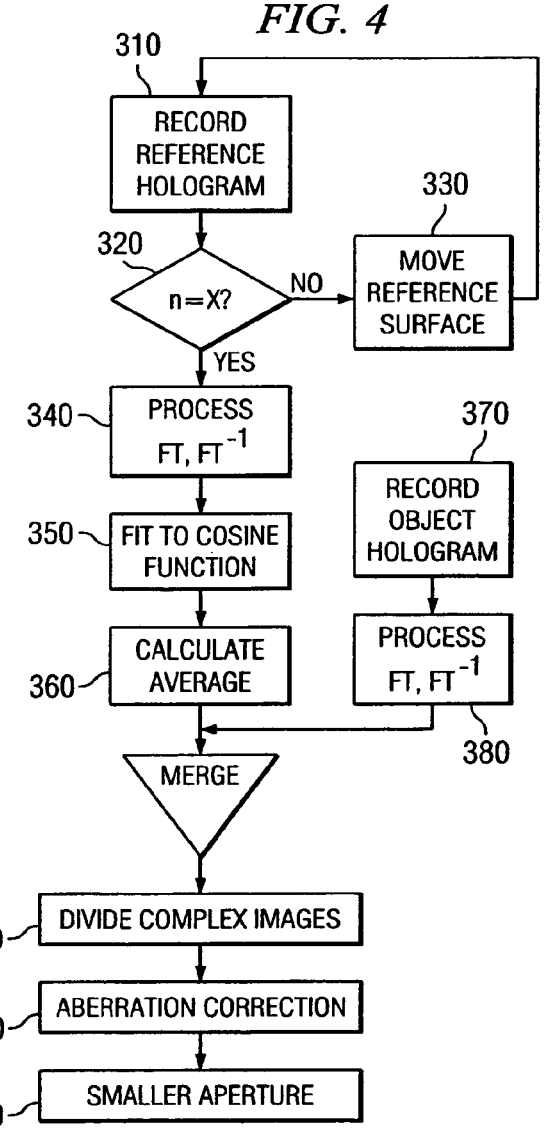

DIRECT-TO-DIGITAL HOLOGRAPHY REDUCTION OF REFERENCE HOLOGRAM NOISE AND FOURIER SPACE SMEARING

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND OF THE INVENTION

1. Field of the Invention

The invention relates generally to the field of direct-to-digital holography (interferometry). More particularly, the invention relates to reduction of direct-to-digital holography reference hologram noise and/or reduction of direct-to-digital holography Fourier space smearing.

2. Discussion of the Related Art

Prior art direct-to-digital holography (DDH), sometimes called direct-to-digital interferometry, is known to those skilled in the art[1-3]. For instance, FIG. 1 illustrates one simplified embodiment of a DDH system. Light from a laser source 105 is expanded by a beam expander/spatial filter 110 and then travels through a lens 115. Subsequently, the expanded filtered light travels to a beamsplitter 120. The beamsplitter 120 may be partially reflective. The portion of light reflected from the beamsplitter 120 constitutes an object beam 125 that travels to the object 130. The portion of the object beam 125 is that is reflected by the object 130 then passes through the beamsplitter 120 and travels to a focusing lens 145. This light then passes through the focusing lens 145 and travels to a charge coupled device (CCD) camera (not shown).

The portion of the light from the lens 115 that passes through the beamsplitter 120 constitutes a reference beam 135. The reference beam 135 is reflected from a mirror 140 at a small angle. The reflected reference beam 135 from the mirror then travels toward the beamsplitter 120. The portion of the reference beam 135 that is reflected from the beamsplitter 120 then travels through the focusing lens 145 and toward the CCD camera (not shown). The object beam 125 from the focusing lens 145 and the reference beam 135 from the focusing lens 145 constitute a plurality of object and reference waves 150 and will interfere at the CCD to produce the interference pattern characteristic of a hologram as noted in U.S. Pat. No. 6,078,392.

A limitation of this technology has been reference hologram noise and/or smearing in Fourier space. What is needed, therefore, is a direct-to-digital holography approach that reduces reference hologram noise and/or Fourier space smearing.

SUMMARY OF THE INVENTION

There is a need for the following aspects of the invention. Of course, the invention is not limited to these aspects.

According to an aspect of the invention, a process comprising reducing reference hologram noise includes: recording a plurality of reference holograms; processing the plurality of reference holograms into a corresponding plurality of reference image waves; and transforming the corresponding plurality of reference image waves into a reduced noise reference image wave. According to another aspect of the invention, a process comprising reducing smearing in Fourier space includes: recording a plurality of reference holograms; processing the plurality of reference holograms into a corresponding plurality of reference complex image waves; transforming the corresponding plurality of reference image waves into a reduced noise reference complex image wave; recording a hologram of an object; processing the hologram of the object into an object complex image wave; and dividing the complex image wave of the object by the reduced noise reference complex image wave to obtain a reduced smearing object complex image wave.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same elements. The invention may be better understood by reference to one or more of these drawings in combination with the description presented herein. It should be noted that the features illustrated in the drawings are not necessarily drawn to scale.

FIG. 3 illustrates a flow diagram of a process to reduce noise in a reference hologram that can be implemented by a computer program, representing an embodiment of the invention.

FIG. 4 illustrates a flow diagram of a process to reduce smearing in Fourier space that can be implemented by a computer program, representing an embodiment of the invention.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals within parentheses. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patent, and allowed U.S. Patent Application, disclose embodiments that were satisfactory for the purposes for which they are intended. The entire contents of U.S. Pat. No. 6,078,392, issued Jun. 20, 2000 to C. E. Thomas, L. R. Baylor, G. R. Hanson, D. A. Rasmussen, E. Voelkl, J. Castracane, M. Simkulet and L. Clow, entitled "*Direct-to-Digital Holography and Holovision*" are hereby expressly incorporated by reference herein for all purposes. The entire contents of allowed U.S. patent application Ser. No. 09/477,267, filed Jan. 4, 2000 by C. E. Thomas and G. R. Hanson, entitled "Improvements To Acquisition and Replay Systems" in which the issue fee has been paid are hereby expressly incorporated by reference herein for all purposes.

The context of the invention can include obtaining, storing and/or replaying digital data. The context of the invention can include processing digital data that represents an image. This digital data processing can include reference hologram noise reduction and/or Fourier space smearing reduction. The context of the invention can also include obtaining direct-to-digital interferometry (holography) image data with an on-axis illumination and/or off-axis illumination interferometer.

Figure 1:
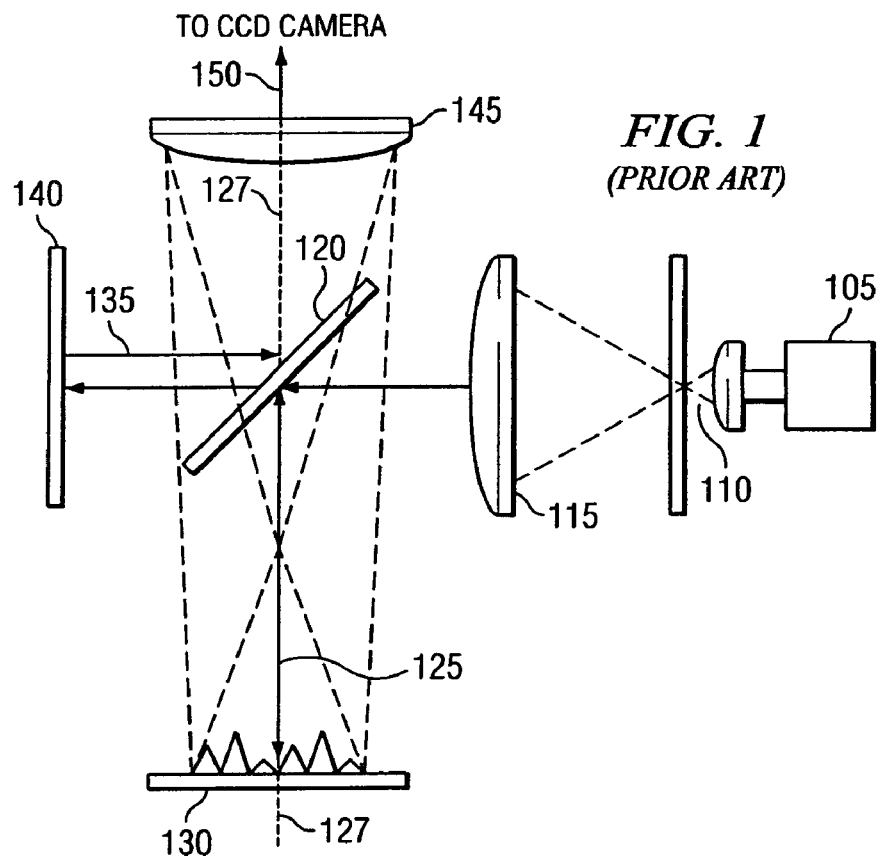
FIG. 1 illustrates a schematic view of a conventional direct-to-digital holography apparatus, appropriately labeled "PRIOR ART."

In general, the object to be observed (imaged) is optically coupled to an illumination source via one or more optical components. As discussed with regard to FIG. 1, the illumination beam is typically passed through the center of the target objective (i.e., lens system) along, and thus parallel to, the optical axis. As evident in FIG. 1, the object beam 125 is parallel to the optical axis 127. This type of DDH configuration can be referred to as "on-axis illumination" and allows spatial frequencies (q) of the object to be acquired up to a certain limit (q0), which is determined by the objective aperture.

Off-axis illumination, on the other hand, refers to the case where the object beam is incident upon the object at some angle with respect to the optical axis. The invention can include an "off-axis illumination" scenario, where the illumination source is displaced laterally so that the beam will pass through the object objective off-center yet still parallel to the optical axis. The illumination will, due to the focusing effect of the objective, be incident upon the object at some angle to the optical axis. Due to this off-axis illumination, higher spatial frequencies (q>q0) of the object can pass through the objective aperture, and thus be observed, than can with on-axis illumination.

The invention can include an extended DDH system (apparatus) that digitally captures the on-axis-illuminated hologram(s) and/or off-axis-illuminated hologram(s) of the same or different object(s). The holograms can be digitally captured with a data recorder, such as a CCD camera. The invention can also include an extended DDH system (apparatus) that includes a computer for processing the recorded data, a memory for storing data and/or a circuit for replaying and/or transmitting data. The computer can include software, firmware and/or hardware for reducing reference hologram noise and/or reducing Fourier space smearing.

Thus, the invention can include a method of recording a spatially heterodyne hologram including spatially heterodyne fringes for Fourier analysis, comprising: splitting a laser beam into a reference beam and an object beam; reflecting the reference beam from a reference mirror at a non-normal angle; reflecting the object beam from an object (optionally at an angle with respect to an optical axis defined by a focusing lens); focusing the reference beam and the object beam, which constitute a plurality of simultaneous reference and object waves, with the focusing lens at a focal plane of a digital recorder to form a spatially heterodyne hologram including spatially heterodyne fringes for Fourier analysis; digitally recording the spatially heterodyne hologram including spatially heterodyne fringes for Fourier analysis; Fourier analyzing the recorded spatially heterodyne hologram including spatially heterodyne fringes by transforming axes of the recorded spatially heterodyne hologram including spatially heterodyne fringes in Fourier space to sit on top of a heterodyne carrier frequency defined as an angle between the reference beam and the object beam; applying a digital filter to cut off signals around an original origin; and then performing an inverse Fourier transform. The method can include diffracting the object beam with an object objective before reflecting the object beam from an object at an angle with respect to an optical axis defined by a focusing lens and after reflecting the object beam from an object at an angle with respect to an optical axis defined by a focusing lens. The step of transforming axes of the recorded spatially heterodyne hologram can include transforming with an extended Fourier transform. The step of digitally recording can include detecting the beams with a CCD camera that defines pixels. The off-axis illuminated spatially heterodyne hologram can be an off-axis illuminated spatially low-frequency heterodyne hologram; the phrase low-frequency implies that the fundamental fringe spatial frequency is below the Nyquist sampling limit. The method can also include storing the spatially heterodyne hologram including spatially heterodyne fringes for Fourier analysis as digital data. The method can also include replaying the Fourier analyzed spatially heterodyne hologram. The method can also include transmitting the Fourier analyzed spatially heterodyne hologram. The invention can include a spatially heterodyne hologram prepared by the above-described method(s), embodied on a computer-readable medium.

Accordingly, the invention can include an apparatus operable to digitally record a spatially heterodyne hologram including spatially heterodyne fringes for Fourier analysis, comprising: a laser; a beamsplitter optically coupled to the laser; a reference beam mirror optically coupled to the beamsplitter; an object optically coupled to the beamsplitter; a focusing lens optically coupled to both the reference beam mirror and the object; a digital recorder optically coupled to the focusing lens; and a computer for performing a Fourier transform, applying a digital filter, and performing an inverse Fourier transform, wherein a reference beam is incident upon the reference beam mirror at a non-normal angle, an object beam is incident upon the object (optionally at an angle with respect to an optical axis defined by the focusing lens), the reference beam and an object beam, which constitute a plurality of simultaneous reference and object waves, are focused by the focusing lens at a focal plane of the digital recorder to form a spatially heterodyne hologram including spatially heterodyne fringes for Fourier analysis which is recorded by the digital recorder, and the computer transforms axes of the recorded spatially heterodyne hologram including spatially heterodyne fringes in Fourier space to sit on top of a heterodyne carrier frequency defined by an angle between the reference beam and the object beam and cuts off signals around an original origin before performing the inverse Fourier transform. The apparatus can include an object objective optically coupled between the beamsplitter and the object. The apparatus can include an aperture stop coupled between the object and the focusing lens. The beamsplitter, the reference beam mirror and the digital recorder can define a Michelson geometry. The beamsplitter, the reference beam mirror and the digital recorder can define a Mach-Zehner geometry. The apparatus can also include a digital storage medium coupled to the computer for performing a Fourier transform, applying a digital filter, and performing an inverse Fourier transform. The digital recorder can include a CCD camera that defines pixels. The apparatus can include a beam expander/spatial filter optically coupled between the laser and the beamsplitter. The angle between the reference beam and the object beam, and a magnification provided by the focusing lens, can be selected in order that the digital recorder may resolve features of the spatially heterodyne hologram including spatially heterodyne fringes for Fourier analysis. So that the digital recorder may resolve a feature, two fringes, each having two pixels per fringe, can be provided. The invention can include a spatially heterodyne hologram produced by the above-described apparatus, embodied on a computer-readable medium.

The invention can include methods and/or apparatus to minimize noise in the reference hologram. The invention can include methods and/or apparatus to minimize smearing in Fourier space (artifacts). The invention can include methods and/or apparatus to both minimize noise in the reference hologram and minimize smearing in Fourier space (artifacts).

The invention can include an extension, improvement and simplification of the Michelson-, Mach-Zehner-, or in general, off-axis-interferometer used for surface imaging or transmissive imaging through magnifying and/or de-magnifying elements combined with a digital, parallel recording device, e.g., a CCD camera. The extension, improvement and simplification can be obtained by data acquisition and processing (e.g., via the use of a computer program).

The invention can include determining low frequency reference hologram noise. The invention can also include removing the low frequency reference hologram noise.

This invention allows for optimization of an interferometer for data acquisition. The invention helps to compensate for most artifacts after the recording process by image processing and thus allows more freedom to modify the interferometer set-up in such a way as to either minimize the number of imaging elements in the set-up or just simplify the set-up. The invention is not limited to light optics but is independent of the nature of the particles or waves or their energy. The invention can be extended to direct-to-digital electron holography.

The general, off-axis-type interferometer is designed such that both arms of the interferometer, the reference arm and the object arm provide an identical (optical) path to the highest degree possible. This requirement, or precaution, is usually necessary to minimize the phase difference between the reference arm and the object arm to obtain a directly interpretable final image. An important advantage of the invention is that the need for this precaution is no longer as great (or the constraints on meeting this need as stringent), since differences in the optical path can be compensated by image processing and possible hardware modifications.

Figure 2:
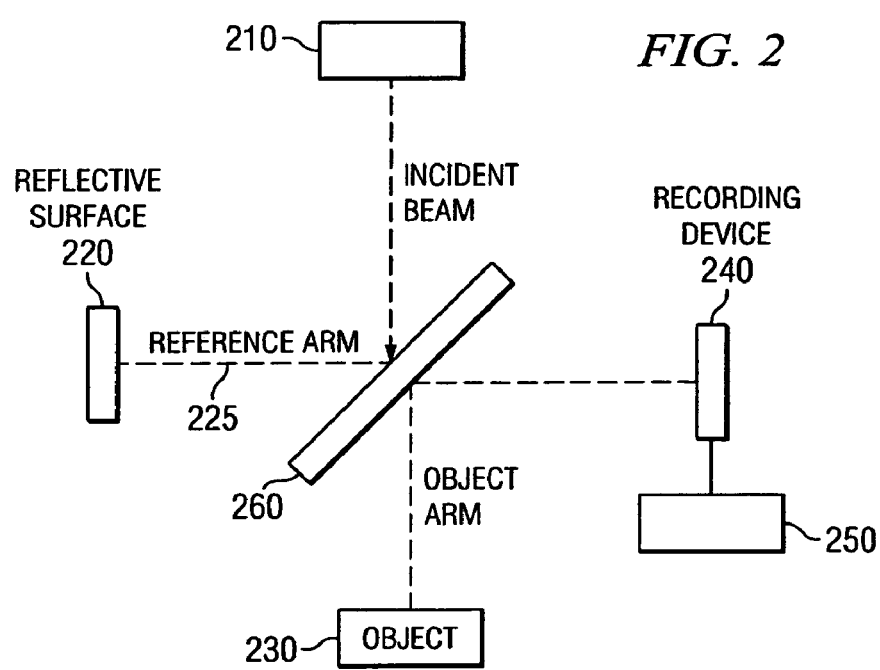
FIG. 2 illustrates a schematic view of a interferometer, representing an embodiment of the invention.

Referring to FIG. 2, the invention can include an interferometer: An illumination source 210 is coupled to a beamsplitter 260. The illumination source 210 can be a laser, a source of electrons, or even a source of neutrons. A reflective surface 220 is coupled to the beamsplitter 260. The reflective surface 220 can be a reference mirror. An object 230 is also coupled to the beamsplitter 260. A recording device 240 is also coupled to the beamsplitter 260. The recording device 240 can be a CCD camera that defines pixels. A computer system 250 is coupled to the recording device 240. The computer system 250 can include software, firmware and/or hardware for reducing reference hologram noise and/or reducing Fourier space smearing. The computer system 250 can also include a memory for storing data and/or a circuit for replaying and/or transmitting data.

FIG. 2 shows a basic Michelson interferometer setup. All off-axis holography or interferometry set-ups are characterized in that the reference beam and the object beam superimpose under an angle, which distinguishes those systems from in-line holography. In the case of an off-axis interferometer, a reference arm includes a reference beam 225 that is incident upon the reflective surface 220 at a non-normal angle. In this case, the reference and object beams can meet at an angle at the focal plane of the recording device 240.

The simplest way of describing an interferometer is to assume a plane wave incident onto the system shown schematically in FIG. 2. After passing through a beam splitter, the plane waves from the object- and reference-arm are combined under an angle in the image plane, i.e., at the recording device. There, the hologram or interferogram is recorded. In this description, interferogram and hologram will be used interchangeably.

The invention can include digital processing. Digital processing of the interferogram permits the display of the phase difference $\Delta\phi$ between the wave incident from the reference arm and the wave incident from the object arm. The phase of the waves incident from the reference arm and the object arm cannot be recorded by themselves. Their phase difference $\Delta\phi$ however is recorded as part of the interferogram and is obtained from the interferogram by means of reconstruction algorithms that are known to those of skill in the art[1-3]. For the case where the wave incident from the reference arm is a plane wave (i.e., with $\phi_{ref}$=const.), the phase difference $\Delta\phi$ is the actual phase $\phi_{obj}$ of the wave incident from the object arm.

The invention can include matching the wave fronts in the reference- and object-arm. When the interferometer is set up, the ray paths of the reference arm and the object arm are usually designed to match each other as closely as possible. For example, in light optics, identical sets of lenses can be used for this purpose. But lenses can be approximated and/or replaced by reflective surfaces. Therefore, although different optical elements are being used in the reference and object arm, the resulting wave fronts in the final image plane can be matched, at least in theory. In reality, the matching of the wavefronts from both arms will not be perfect. The invention describes how to correctly handle this real situation by image processing.

A reference hologram (or reference interferogram) is recorded either in absence of an object (in the transmissive mode) or in presence of an ideal reflective object with no spatial frequencies (e.g., a substantially perfectly flat and flawless mirror). The reference hologram then contains the system inherent phase modulations (defined as $\phi_{inh}$). This information about the interferometer is important as it allows the holographer to remove the system inherent artifacts from the phase images.

The invention can include addressing the problems of limited compensation of system-inherent phase modulation due to noise and other artifacts. In the presence of an object, the reconstructed phase $\Delta\phi$ is described by $\Delta\phi(x,y)=\phi_{inh}(x,y)+\phi_{obj}(x,y)$. Constant phase values are ignored. The corrected reconstructed phase $\Delta\phi(x,y)=\phi_{inh}(x,y)+\phi_{obj}(x,y))-\phi_{inh}(x,y)$ can be obtained by dividing the complex image (with object), obtained from the reconstruction process, by the complex image obtained through the same reconstruction process from the reference hologram[1-3]. However, the $\phi_{inh}$ derived from the reference hologram can contain significant noise and/or artifacts that need to be treated to minimize their effect on the final result $\Delta\phi(x,y)=\phi_{obj}(x,y)$ and to allow the correction of isoplanatic aberrations like spherical aberrations of the imaging elements of the interferometer.

Reference Hologram Noise Reduction

As noted above, the invention can include methods and apparatus to minimize noise in the reference hologram.

In order to reduce the noise in the reference hologram, a plurality of reference holograms are recorded and processed to obtain a corresponding plurality of complex images or phase images that are in-turn processed to obtain a $\phi_{inh}(x,y)'$ with reduced noise compared to $\phi_{inh}(x,y)$. The processing of the holograms can include performing a Fourier transform followed by performing a consecutive inverse Fourier transform. The processing of the corresponding plurality of images can include statistically processing, for example, calculating an average (e.g., mean, median, mode) of the plurality of complex images. The processing can include transforming the average and/or the individual complex images by fitting with one, or more, mathematical functions.

In an embodiment of the invention, first several holograms are recorded and processed to obtain several complex images that are then averaged. Then, $\phi_{inh}(x,y)'$ is obtained mathematically by fitting the average complex image to a polynomial, trigonometric (e.g., cosine), exponential or other function.

In another embodiment of the invention, first several holograms are recorded and processed to obtain several complex images that are then individually fitted to a polynomial, trigonometric (e.g., cosine), exponential or other function. Then, the several fitted complex images are averaged to obtain $\phi_{inh}(x,y)'$.

In the case of a non-transmissive system (e.g., a reflective object), a preferred embodiment of the invention can include first recording several holograms from different areas on a reference surface (e.g., reference mirror or reference slat) to minimize contributions from a non-perfect reference area. The reference surface should be moved (i.e., displaced and/or rotated) substantially within the plane defined by the reference surface. The several holograms are then processed and the corresponding several complex images statistically processed and/or transformed (in either order) as described above to obtain $\phi_{inh}(x,y)'$.

Be this as it may, a hologram of an object of interest is recorded and then processed to obtain an object image wave $(\phi_{inh}(x,y)+\phi_{obj}(x,y))$. The computed function $\phi_{inh}(x,y)'$ is then used to compensate system inherent phase modulations according to $\Delta\phi(x,y)=(\phi_{inh}(x,y)+\phi_{obj}(x,y))-\phi_{inh}(x,y)'$.

Referring to FIG. 3, an example of reference hologram noise reduction is depicted. In blocks 310–330, a series of reference holograms 1,2, . . . , n are recorded from different areas of a reference surface until n=X (a selected number of samples). In block 340, each of the reference holograms is processed to obtain a reference complex image wave. In block 350, each of the reference complex image waves is fit to a cosine function. In block 360, an average of the fitted reference complex image waves is calculated to obtain $\phi_{inh}(x,y)'$. In block 370, an object hologram is recorded. In block 380, the reference hologram is processed to obtain an object complex image wave. In block 390, the average of the fitted reference complex image waves is subtracted from the object complex image wave to obtain a result $\Delta\phi(x,y)=(\phi_{inh}(x,y)+\phi_{obj}(x,y))-\phi_{inh}(x,y)'$.

Although the example shown in FIG. 3 depicts fitting each reference image to a cosine function and then calculating the average reference image, it is important to note that the fitting may be to any function and the calculation of the average may be done first, wherein the fitting will be of the average. Further, the fitting (and/or movement of the reference surface) may be omitted.

Fourier Space Smearing Reduction

As noted above, the invention can include methods and apparatus to minimize smearing in Fourier space (artifacts). An additional problem exists, if the phase modulations of $\phi_{inh}(x,y)$ are significant (e.g., $>\pi$). If $\phi_{inh}(x,y)'$ displays significant modulations, the interferences fringes will not remain equidistant throughout the interferogram. As a consequence, the spatial frequencies of the object will be "smeared" in Fourier space and become dependent on the x,y coordinates in real space. This dependence causes serious problems for the reconstruction process and effectively inhibits correction of aberrations (e.g., spherical aberration). This problem can be overcome by the following processing steps.

The function $\phi_{inh}(x,y)'$ is calculated as described above with regard to noise reduction, optionally with a somewhat larger aperture.

A hologram with an object is recorded and processed to obtain an object complex image wave. The hologram with the object can be recorded and processed to obtain the object complex image wave with a larger aperture.

The complex image wave of the object is then divided by $\exp(i\phi_{inh}(x,y)')$. This reduces (e.g., substantially removes) smearing in Fourier space and a consecutive inverse Fourier transform yields an optimized $\Delta\phi(x,y)=\phi_{obj}(x,y)$. Once the smearing is reduced, the following two optional procedures can be performed, singularly or in combination in either order.

If aberration correction is required, a Fourier transform is performed and a corresponding phase plate can be used. A consecutive inverse Fourier transform yields a further optimized $\Delta\phi(x,y)=\phi_{obj}(x,y)$. Most significantly and never before realized, the division of the complex image wave of the object by $\exp(i\phi_{inh}(x,y)')$ enables this aberration correction sub-process to succeed.

If further noise reduction is required, a Fourier transform is performed and a smaller aperture can be used since allowance for smearing is no longer needed. As above, a consecutive inverse Fourier transform yields a further optimized $\Delta\phi((x,y)=\phi_{obj}(x,y)$. Also, as above, most significantly and never before realized, the division of the complex image wave of the object by $\exp(i\phi_{inh}(x,y)')$ enables this noise reduction sub-process to succeed.

Referring to FIG. 4, an example of Fourier space smearing reduction is depicted. The transformations of the reference holograms into $\phi_{inh}(x,y)'$ and the transformation of the object hologram into $(\phi_{inh}(x,y)+\phi_{obj}(x,y))$ can be the same as described above with regard to FIG. 3. Referring again to FIG. 4, in block 410 the complex image wave of the object is then divided by $\exp(i\phi_{inh}(x,y)')$. In block 420, aberration correction is performed. In block 430, further noise reduction is performed with a smaller aperture.

Although this example shown in FIG. 4 depicts aberration correction followed by further noise reduction with a smaller aperture, it is important to note that the further noise reduction may be done first, and the aberration correction done second. Further, the aberration correction and/or further noise reduction may be omitted.

Practical Applications of the Invention

A practical application of the invention that has value within the technological arts is metrology. The invention is useful in conjunction with microelectronic(mechanical) fabrication, such as for semiconductor inspection. The invention is also useful in conjunction with nanotechnology research, development and manufacturing, such as nanovisualization, nanomeasurement, or the like. The invention is useful in the context of an interferometer using digital processing and/or a digital data acquisition, for example, a direct-to-digital holography tool based on electron holography. There are virtually innumerable uses for the invention, all of which need not be detailed here.

Advantages of the Invention

A method, apparatus and/or computer program, representing an embodiment of the invention, can be cost effective and advantageous for at least the following reasons. The invention allows minimization of the decrease of the signal/noise level caused by standard removal of the system-inherent phase. The invention allows minimization of possible artifacts when recording the system-inherent phase information. The invention allows correction of isoplanatic aberrations even with less than ideal optics (phase shifts >$\pi$). The invention improves quality and/or reduces costs compared to previous approaches.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system. The phrase low-frequency, as used herein, can be defined as implying that the fundamental fringe spatial frequency is below the Nyquist sampling limit.

All the disclosed embodiments of the invention disclosed herein can be made and used without undue experimentation in light of the disclosure. The invention is not limited by theoretical statements recited herein. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all configurations. Further, variation may be made in the steps or in the sequence of steps composing methods described herein. Further, although the apparatus described herein can be a separate module, it will be manifest that the apparatus may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES (1) U.S. Pat. No. 6,078,392, issued Jun. 20, 2000 to C. E. Thomas, L. R. Baylor, G. R. Hanson, D. A. Rasmussen, E. Voelkl, J. Castracane, M. Simkulet and L. Clow, entitled "Direct-to-Digital Holography and Holovision."
(2) Allowed U.S. patent application Ser. No. 09/477,267, filed Jan. 4, 2000 by C. E. Thomas and G. R. Hanson, entitled "Improvements To Acquisition and Replay Systems" (see published version of PCT/US00/34982)
(3) Goodman, Joseph W., "Introduction to Fourier Optics," McGraw-Hill, 1998.
(4) Voelkl, E. et al., "Introduction to Electron Holography," Kluwer Academics/Plenum Publishers, 1999.
(5) Eugene Hecht, "Optics, Third Edition," Addison-Wesley, 1998, page 465–469; 599–602.

What is claimed is:

1. A method, comprising reducing reference hologram noise including:
   recording a plurality of reference holograms;
   processing the plurality of reference holograms into a corresponding plurality of reference image waves including Fourier analyzing the plurality of reference holograms by transforming axes of the plurality of reference holograms in Fourier space to sit on top of a heterodyne carrier frequency defined as an angle between a reference beam and an object beam and applying a digital filter to cut off signals around an original origin and then performing an inverse Fourier transform; and
   transforming the corresponding plurality of reference image waves into a reduced noise reference image wave by calculating an average of the plurality of reference image waves.

2. The method of claim 1, further comprising:
   recording a hologram of an object;
   processing the hologram of the object into an object image wave; and
   subtracting the reduced noise reference image wave from the object image wave to compensate for system inherent phase modulation.

3. The method of claim 1, wherein the corresponding plurality of reference image waves include a corresponding plurality of complex image waves.

4. The method of claim 1, wherein the corresponding plurality of reference image waves include a corresponding plurality of phase image waves.

5. The method of claim 1, wherein transforming the corresponding plurality of reference image waves into a reduced noise reference image wave includes fitting the average of the plurality of reference image waves to at least one function.

6. The method of claim 5, wherein the at least one function is selected from the group consisting of a polynomial function, a trigonometric function and an exponential function.

7. The method of claim 6, wherein the at least one function include a cosine function.

8. The method of claim 1, wherein transforming the corresponding plurality of reference image waves into a reduced noise reference image wave includes fitting each of the corresponding plurality of reference image waves to at least one function.

9. The method of claim 8, wherein the at least one function is selected from the group consisting of a polynomial function, a trigonometric function and an exponential function.

10. The method of claim 9, wherein the at least one function include a cosine function.

11. The method of claim 1, wherein the plurality of reference holograms are selected from different areas on a reference surface to minimize contributions from a non-perfect reference area.

12. The method of claim 11, wherein the reference surface is moved within a plane defined by the reference surface.

13. A direct to digital hologram made by the method of claim 1.

14. A method, comprising reducing smearing in Fourier space including:
   recording a plurality of reference holograms;
   processing the plurality of reference holograms into a corresponding plurality of reference complex image waves including Fourier analyzing the plurality of reference holograms by transforming axes of the plurality of reference holograms in Fourier space to sit on top of a heterodyne carrier frequency defined as an angle between a reference beam and an object beam and applying a digital filter to cut off signals around an original origin and then performing an inverse Fourier transform;
   transforming the corresponding plurality of reference image waves into a reduced noise reference complex image wave by calculating an average of the plurality of reference complex images;
   recording a hologram of an object;
   processing the hologram of the object into an object complex image wave; and
   dividing the complex image wave of the object by the reduced noise reference complex image wave to obtain a reduced smearing object complex image wave.

15. The method of claim 14, wherein transforming the corresponding plurality of reference image waves into a reduced noise reference image wave includes fitting the average of the plurality of reference image waves to at least one function.

16. The method of claim 15, wherein the at least one function is selected from the group consisting of a polynomial function, a trigonometric function and an exponential function.

17. The method of claim 16, wherein the at least one function include a cosine function.

18. The method of claim 14, wherein transforming the corresponding plurality of reference image waves into a reduced noise reference image wave includes fitting each of the corresponding plurality of reference image waves to at least one function.

19. The method of claim 18, wherein the at least one function is selected from the group consisting of a polynomial function, a trigonometric function and an exponential function.

20. The method of claim 19, wherein the at least one function include a cosine function.

21. The method of claim 14, wherein the plurality of reference holograms are selected from different areas on a reference surface to minimize contributions from a non-perfect reference area.

22. The method of claim 21, wherein the reference surface is moved within a plane defined by the reference surface.

23. The method of claim 14, wherein the plurality of reference holograms are processed with a synthetic aperture in Fourier space that accommodates smearing in Fourier space due to non-planar illumination.

24. The method of claim 14, wherein the hologram of the object is processed with a synthetic aperture in Fourier space that accommodates smearing in Fourier space due to non-planar illumination.

25. A direct to digital hologram made by the method of claim 14.

26. A method, comprising reducing smearing in Fourier space including:
   recording a plurality of reference holograms;
   processing the plurality of reference holograms into a corresponding plurality of reference complex image waves;
   transforming the corresponding plurality of reference image waves into a reduced noise reference complex image wave;
   recording a hologram of an object;
   processing the hologram of the object into an object complex image wave;

dividing the complex image wave of the object by the reduced noise reference complex image wave to obtain a reduced smearing object complex image wave;

performing a Fourier transform on the reduced smearing object complex image wave;

correcting aberration with a corresponding phase plate; and performing a consecutive inverse Fourier transform to yield an optimized $\alpha\phi(x,y)$ that is substantially equal to $\phi_{obj}(x,y)$.

27. A method, comprising reducing smearing in Fourier space including:

recording a plurality of reference holograms;

processing the plurality of reference holograms into a corresponding plurality of reference complex image waves;

transforming the corresponding plurality of reference image waves into a reduced noise reference complex image wave;

recording a hologram of an object;

processing the hologram of the object into an object complex image wave;

dividing the complex image wave of the object by the reduced noise reference complex image wave to obtain a reduced smearing object complex image wave;

performing a Fourier transform on the reduced smearing object complex image wave;

processing the Fourier transformed reduced smearing object complex image wave with a synthetic aperture in Fourier space that does not accommodate smearing in Fourier space due to non-planar illumination; and performing a consecutive inverse Fourier transform to yield an optimized $\Delta\phi(x,y)$ that is substantially equal to $\phi_{obj}(x,y)$.

* * * * *